United States Patent [19]

Dudek et al.

[11] Patent Number: 5,070,846

[45] Date of Patent: Dec. 10, 1991

[54] METHOD FOR ESTIMATING AND CORRECTING BIAS ERRORS IN A SOFTWARE AIR METER

[75] Inventors: Kenneth P. Dudek, Rochester Hills; Ronald A. Davis, Milford, both of Mich.

[73] Assignee: General Motors Corporation, Detroit, Mich.

[21] Appl. No.: 653,923

[22] Filed: Feb. 12, 1991

Related U.S. Application Data

[63] Continuation-in part of Ser. No. 618,124, Nov. 26, 1990, abandoned.

[51] Int. Cl.[5] .......... F02D 41/18; G01F 1/34

[52] U.S. Cl. .......... 123/488; 123/494; 73/118.2; 364/510; 364/550

[58] Field of Search .......... 123/478, 480, 488, 494; 73/118.2, 861.03; 364/510, 550, 556, 558, 431.04, 431.05

[56] References Cited

U.S. PATENT DOCUMENTS

| | | | |
|---|---|---|---|
| 4,386,520 | 6/1983 | Nagaishi | 73/118.2 |
| 4,437,340 | 3/1984 | Csere et al. | 73/118.2 |
| 4,502,325 | 3/1985 | Klomp | 73/118.1 |
| 4,548,185 | 10/1985 | Pozniak | 123/571 |
| 4,599,694 | 7/1986 | Aposchanski et al. | 364/431.05 |
| 4,644,474 | 2/1987 | Aposchanski et al. | 364/431.05 |
| 4,664,090 | 5/1987 | Kabasin | 123/494 |
| 4,761,994 | 8/1988 | Sogawa | 73/118.2 |
| 4,785,785 | 11/1988 | Oba et al. | 123/488 |
| 4,860,222 | 8/1989 | Schmidt et al. | 364/550 |
| 4,892,072 | 1/1990 | Miwa et al. | 123/494 X |
| 4,893,244 | 1/1990 | Tang et al. | 364/431.03 |
| 4,911,128 | 3/1990 | Hara et al. | 123/494 X |
| 4,945,883 | 8/1990 | Ono et al. | 123/494 |
| 4,957,088 | 9/1990 | Hosaka | 123/488 X |
| 4,967,715 | 11/1990 | Hosaka | 123/494 |
| 4,984,553 | 1/1991 | Kako et al. | 123/488 X |
| 4,987,888 | 1/1991 | Funabashi et al. | 123/488 |

OTHER PUBLICATIONS

"State Functions and Linear Control Systems", 1-1967, Mc-Graw-Hill, Inc., U.S.A.

"Probability, Random Variables, and Stochastic Processes", 1-1965, McGraw-Hill, Inc. U.S.A.

*Primary Examiner*—Willis R. Wolfe
*Attorney, Agent, or Firm*—Anthony Luke Simon

[57] ABSTRACT

A method for estimating and correcting bias errors in a vehicle system which implements iterative prediction and estimation to determine a measure of at least one determinable vehicle engine parameter determines if the vehicle engine is in a substantially steady state condition, determines a measure of error between the predicted and measured values of a control parameter while the vehicle is in the steady state condition, estimates a system bias in response to the determined error, and offsets the system bias in subsequent predictions, thereby reducing the error between the predicted and measured values of the control parameter and increasing the accuracy of the estimations of the determinable vehicle parameter.

25 Claims, 3 Drawing Sheets

METHOD FOR ESTIMATING AND CORRECTING BIAS ERRORS IN A SOFTWARE AIR METER

This application is a continuation-in-part of U.S Ser. No. 07/618,124, filed on Nov. 26, 1991, assigned to the assignee of this application and abandoned with the filing of this application.

This invention relates to correction of bias errors in systems that use mathematical models to estimate engine parameters.

This patent application is related to copending U.S. patent application Ser. No. 653,931, filed Feb. 12, 1991, entitled "Software Air Meter", and Ser. No. 653,922, filed Feb. 12, 1991 entitled "Method for Predicting R-Step Ahead Engine State Measurements", both filed concurrently with this application and assigned to the assignee of this application. The disclosures of patent applications numbers Ser. Nos. 653,931 and 653,922 are hereby incorporated into this application by reference.

BACKGROUND OF THE INVENTION

Copending U.S. patent application Ser. No. 653,931 discloses a method for accurately measuring mass airflow into an internal combustion engine without a mass airflow meter. The method employs a technique of iterative prediction and estimation to determine mass airflow into the engine in response to measures of various engine parameters and a set of model parameters. One implementation of the method is described below.

Various engine parameters are measured with various input devices at each time event, with k designating the present time event. The measured engine parameters include throttle position, TPS(k), engine speed, RPM(k), idle air control valve position, IAC(k), exhaust gas recirculation (EGR) valve position, EGR(k), air temperature, T(k), atmospheric pressure, ATM(k), and intake manifold absolute pressure, MAP(k). A mathematical model of the engine is predetermined and comprises the parameters: (i) $a_t$, the MAP prediction model state coefficients, (ii) $b_t$, the airflow prediction model state coefficients, (iii) $c_t$, the MAP prediction model input coefficients, (iv) $d_t$, the airflow prediction model input coefficients, and (v) $h_1$ and $h_2$, the MAP and mass airflow prediction model constants, respectively.

Manifold pressure predictions and mass airflow predictions, $MAP^P(k-t)$ and $MAP^P(k-t)$, comprising the vector $X^P(k)$, where:

$$X^P(K) = \begin{pmatrix} MAP^P(k-j) \\ MAP^P(k-j+1) \\ \cdot \\ \cdot \\ \cdot \\ MAP^P(k) \\ MAF^P(k-i) \\ MAF_p(k-i+1) \\ \cdot \\ \cdot \\ \cdot \\ MAF^P(k) \end{pmatrix},$$

and where i and j are system constants, are computed from previous estimations of manifold air pressure and mass airflow, $MAP^e(k-t)$ and $MAF^e(k-t)$, comprising vector $X^e(k)$, the measured engine parameters comprising vector U(k), and the model parameters comprising matrices A, B, and C. the vectors $X^e(k)$, U(k), and matrices A, B, and C are defined as follows:

$$X^e(K) = \begin{pmatrix} MAP^e(k-j) \\ MAP^e(k-j+1) \\ \cdot \\ \cdot \\ \cdot \\ MAP^e(k) \\ MAF^e(k-i) \\ MAF^e(k-i+1) \\ \cdot \\ \cdot \\ \cdot \\ MAF^e(k) \end{pmatrix},$$

$$U(k) = \begin{pmatrix} TPS(k) \\ TPS(k-1) \\ \cdot \\ \cdot \\ \cdot \\ TPS(k-e) \\ RPM(k) \\ RPM(k-1) \\ \cdot \\ \cdot \\ \cdot \\ RPM(k-m) \\ IAC(k) \\ EGR(k) \\ EGR(k-1) \\ \cdot \\ \cdot \\ \cdot \\ EGR(k-n) \\ T(k) \\ ATM(k) \\ ATM(k-1) \\ \cdot \\ \cdot \\ \cdot \\ ATM(k-1) \end{pmatrix},$$

$$A = \begin{pmatrix} 0 & 1 & 0 & \ldots & 0 & 0 & 0 & \ldots\ldots \\ 0 & 0 & 1 & 0\ldots & 0 & \cdot & 0 & 0\ldots\ldots \\ \cdot & \cdot & 0 & \cdot & \cdot & \cdot & \cdot & \cdot\;\cdot\;\cdot \\ \cdot & \cdot & \cdot & \cdot & \cdot & \cdot & \cdot & \cdot\;\cdot\;\cdot \\ \cdot & \cdot & \cdot & \cdot & 0 & \cdot & \cdot & \cdot\;\cdot\;\cdot \\ \cdot & 0 & \cdot & 0 & 1 & 0 & 0 & 0\ldots\ldots \\ a_1 & a_2 & \ldots & a_j & a_{j+1} & a_{j+2} & a_{j+3} & \ldots\; a_{j+i+2} \\ 0 & 0 & \ldots & 0 & 0 & 1 & 0 & \ldots 0 \\ 0 & 0 & \ldots & 0 & \cdot & 0 & 1 & 0\ldots \\ \cdot & \cdot & \cdot & \cdot & \cdot & \cdot & 0 & \cdot\;\;\cdot \\ \cdot & \cdot & \cdot & \cdot & \cdot & \cdot & \cdot & \cdot\;\;\cdot \\ \cdot & \cdot & \cdot & \cdot & \cdot & \cdot & \cdot & \cdot\;\;0 \\ 0 & \cdot & \cdot & \cdot & 0 & 0 & 0 & \ldots 0\;1 \\ b_1 & b_2 & \ldots & b_j & b_{j+1} & b_{j+2} & b_{j+3} & \ldots\; b_{j+i+2} \end{pmatrix} \begin{matrix} (1) \\ (2) \\ \cdot \\ \cdot \\ \cdot \\ \cdot \\ (j+1) \\ (j+2) \\ \cdot \\ \cdot \\ \cdot \\ \cdot \\ \cdot \\ (j+i+2) \end{matrix},$$

$$B = \begin{pmatrix} 0 & \ldots & 0 \\ \cdot & & \cdot \\ \cdot & & \cdot \\ \cdot & & \cdot \\ 0 & & 0 \\ c_1 & \ldots & c_{e+m+n+1+6} \\ 0 & \ldots & 0 \\ \cdot & & \cdot \\ \cdot & & \cdot \\ \cdot & & \cdot \\ 0 & \ldots & 0 \\ d_1 & \ldots & d_{e+m+n+1+6} \end{pmatrix} \begin{matrix} (1) \\ (2) \\ \cdot \\ \cdot \\ (j+1) \\ (j+2) \\ \cdot \\ \cdot \\ \cdot \\ \cdot \\ (j+i+2) \end{matrix}, \text{ and } C = \begin{pmatrix} 0 \\ \cdot \\ \cdot \\ \cdot \\ 0 \\ h_1 \\ 0 \\ \cdot \\ \cdot \\ \cdot \\ 0 \\ h_2 \end{pmatrix};$$

where e, m, n, and 1 are system constants. The prediction of manifold pressure and mass airflow is governed by the equation:

$$X^P(k+1)=AX^e(k)+BU(k)+C.$$

After the prediction step, an estimation of manifold pressure and mass airflow, $MAP^e(k-t)$ and $MAF^e(k-t)$, comprising vector $X^e(k)$ is computed according to the equation:

$$X^e(k+1)=X^P(k+1)+G(MAP(k+1)-MAP^P(k+1)),$$

where G is a vector comprising manifold pressure and mass airflow estimator correction coefficients, $G_{1,t}$ and $G_{2,t}$, respectively, such that:

$$G=\begin{pmatrix} G_{1,j} \\ G_{1,j-1} \\ \cdot \\ \cdot \\ \cdot \\ G_{1,0} \\ G_{2,i} \\ G_{2,i-1} \\ \cdot \\ \cdot \\ \cdot \\ G_{2,0} \end{pmatrix},$$

where the estimator correction coefficients comprising G are determined through a method such as statistical optimization. The estimated mass airflow, $MAF^e(k+1)$, is used as an accurate measure of mass airflow into the engine which is necessary for supplying the appropriate air fuel ratio for the engine and other engine controls.

The accuracy of the software air meter can be limited if a bias in one of the input devices used to measure the engine parameters occurs or if there is an error in one of the model parameters. What is desired is a method of compensating for these biases and like biases in similar systems.

SUMMARY OF THE PRESENT INVENTION

This invention provides a method for estimating and correcting bias errors in systems which predict and estimate a determinable engine parameter based on the state of other engine parameters and which predict at least one other engine parameter which is measurable (the control parameter). One such system is the software air meter set forth in the above mentioned related patent application. This invention operates on the principle that, in a steady state condition, the predictions and estimations of the above mentioned systems achieve a virtual steady state. Furthermore, the predicted (or estimated) control parameter, e.g., $MAP^P(k)$ (or $MAP^e(k)$) in the software air meter, can be compared to actual measures of the control parameter, e.g., MAP(k), which are virtually constant when the engine is in a steady state condition, to develop a resulting steady state error in the predicted (or estimated) control parameter, e.g., $MAP^P(k)$ (or $MAP^e(k)$).

The steady state error can be attributed to a bias in an input parameter or model parameter most likely to be biased. The bias of the input or model parameter in error can be estimated fairly accurately in response to the steady state error and model parameters. Because there is only one measurable parameter which is also predicted, the control parameter (e.g., manifold pressure in the software air meter), and because the persistent control parameter prediction errors are linearly related to persistent previous control parameter prediction errors, only one input or model parameter bias may be estimated at any particular time. The other input parameters and model parameters are assumed to have zero error.

By determining the input or model parameter bias, improved accuracy in the model predictions (and/or estimations) may be achieved by offsetting the input or model parameter by the estimated bias amount when calculating the model-based predictions. When the estimated bias is offset during calculation of the predictions, the subsequent estimations are more accurate. Use of this invention with the software air meter disclosed in the above mentioned related patent application significantly improves the accuracy of the estimated mass airflow into the engine.

More particularly, the method of this invention includes the step of determining if the vehicle engine is in a substantially steady state condition. If the vehicle is in a substantially steady state condition, a measure of error between the predicted and measured values of the control parameter is then determined and a system bias is estimated in response to the determined error. Once the system bias is estimated, it is offset in subsequent predictions, thereby reducing the error between the predicted and measured values of the control parameter and increasing the accuracy of the estimations of the determinable vehicle parameter.

FIGS. *4a* and *4b* comprise a computer flow diagram for the preferred implementation of this invention with the software air meter.

DETAILED DESCRIPTION OF THE INVENTION

Figure 1:
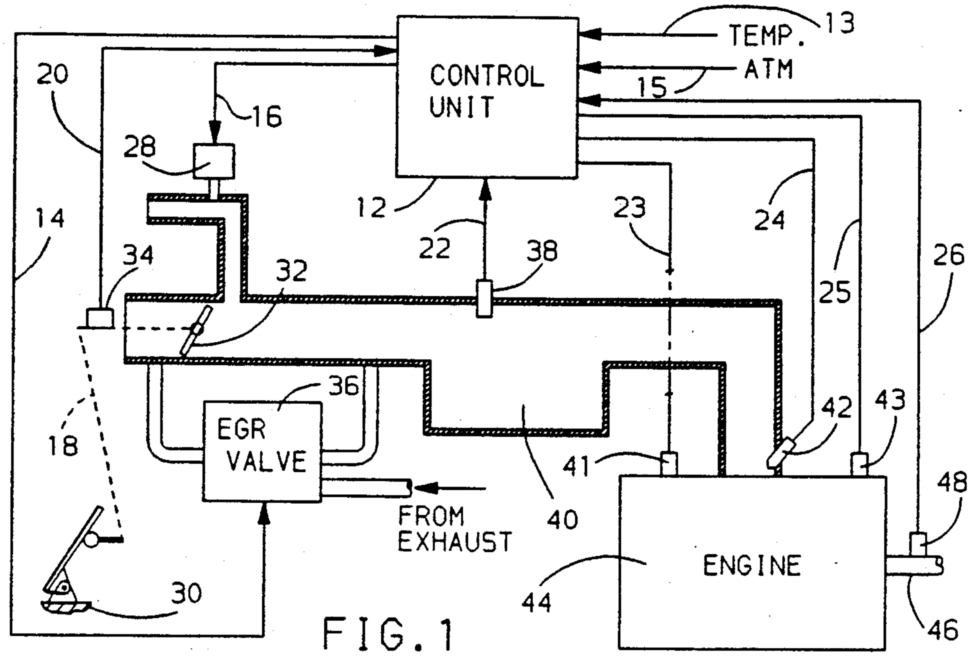
FIG. 1 is a schematic diagram representing a vehicle system in which this invention may be implemented.

This invention is preferably used with the software air meter of the above mentioned related patent application. FIG. 1 shows an engine assembly in which the software air meter and this invention may be implemented. The engine assembly shown includes the engine 44, fuel injectors 42, spark plugs 41 and 43, air intake manifold 40, throttle 32, exhaust gas recirculation (EGR) valve 36, and idle air control (IAC) valve 28. The throttle is controlled by accelerator pedal 30 as shown by dotted line 18 and the IAC valve 28, EGR valve 36, spark plugs 41 and 43, and fuel injectors 42 are controlled by controller 12 through lines 16, 14, 23, 25 and 24, respectively. Air temperature and atmospheric pressure are sensed by sensors (not shown) and input into the controller 12 through lines 13 and 15. The positions of the IAC valve 28 and the EGR valve 36 are determined from the commands on command lines 16 and 14, or they may be measured directly using position sensors (not shown). The throttle position and manifold pressure are sensed by sensors 34 and 38 and input into the control unit 12 through lines 20 and 22. Engine speed is measured through the sensor 48, which detects the rotations of output shaft 46, and input into the control unit 12 through line 26. The sensors mentioned are all standard sensors, a variety of which are readily available to those skilled in the art.

The control unit 12 is a standard control unit easily implemented by one skilled in the art and preferably includes a microcomputer that runs a computer program implementing the present invention together with the standard engine control functions. The computer program may be stored in ROM. The control unit should also include RAM for storage of data including computed variables and measurements of various engine parameters. In addition, the control unit includes an input/output unit and standard interfaces to the different sensors and valves.

In an implementation of this invention with the software air meter, the control unit determines the measures of the engine parameters, which may include EGR valve position, IAC valve position, manifold pressure, engine speed, temperature, and atmospheric pressure and uses the measurements in the prediction-estimation process described above and the bias error estimation and correction process described below to determine an accurate measure of the mass airflow into the engine. Once an accurate measure of the mass airflow into the engine is determined, the fuel injectors 42 can be controlled through lines 24 so that a proper air fuel ratio enters the engine 44. The mass airflow into the engine can also be used together with other engine parameters to determine the timing of spark plugs 41 and 43.

Many engines do not have both an IAC valve 28 and an EGR valve 36, but the presence of either or both of these valves is not necessary as FIG. 1 illustrates only one system in which the present invention may be implemented. Furthermore, the atmospheric pressure need not be determined for successful implementation of the invention. Taking atmospheric pressure into account, however, increases the accuracy of the computed mass airflow measurement.

Figure 2:
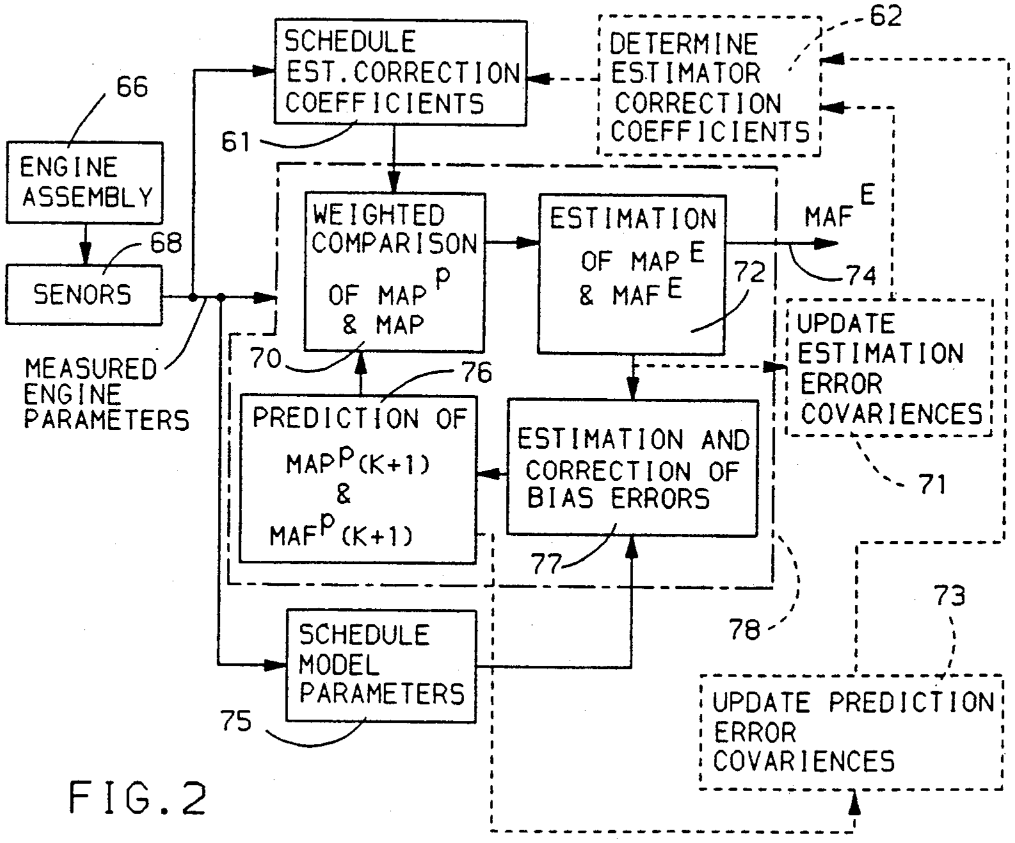
FIG. 2 is a flow diagram of a software air meter system in which this invention is implemented.

The flow diagram in FIG. 2 illustrates generally how this invention works when implemented with a software air meter. The sensors 68 measure the parameters of the engine assembly 66 and the resulting measurements are used to schedule the estimator correction coefficients comprising vector G at block 61 and to schedule the model parameters comprising matrices A, B, and C at block 75. The development and scheduling of the model parameters is fully disclosed in the above mentioned related patent application and will not be set forth herein.

Blocks 62, 71 and 73 represent one method (Kalman filtration) of determining the estimator correction coefficients. The determination and scheduling of the estimator correction coefficients is fully set forth in the above mentioned related patent application and will not be further set forth herein because it is not central to this invention.

The prediction-estimation method is an iterative process with each prediction depending on the previous estimation and each estimation depending on the previous prediction. In block 76, the manifold pressure and mass airflow are predicted as described above and in blocks 70 and 72 manifold pressure and mass airflow are estimated as described above. In block 77, bias errors that are substantially attributable to one input parameter or one model parameter are estimated. The input or model parameter substantially responsible for the bias error is then offset in subsequent predictions, resulting in more accurate predictions and estimations.

More particularly, the estimation of bias errors in block 77 first involves the determination of whether the engine is running in a steady state. While the engine is running in a steady state, the measures of the various engine parameters remain virtually unchanged from one time event to the next. It can be shown that the model-based predictions and the error-based corrections in systems in which this invention may be implemented also achieve a virtual steady state. In such a steady state condition, if there is an error between the predicted control parameter and the actual measure of the control parameter, it is fairly consistent. Under certain conditions, this error may be attributable to bias in one of the input parameter measurements or a bias in one of the model parameters.

Certain input measurements, such as air temperature, atmospheric pressure and engine speed are fairly immune to bias error because of the sensor characteristics and/or the sensor information processing in the vehicle control unit. At engine idle, the throttle is in a closed position, so error in throttle position measurement can be eliminated at idle. If the model parameters, A, B, and C, and the estimator error coefficients, G, are well chosen, they do not cause a consistent error. Once all of the other factors are eliminated, which may be done at idle, or possibly another steady state condition, prediction errors can be attributable to an unaccounted for input parameter measurement or a model parameter.

Using the above described software air meter as an example, it can be shown that, where $X^a_{ss}$ is the actual measurement steady state vector for manifold pressure and mass airflow, $X^P_{ss}$ is the the steady state prediction vector, and $\delta U_{ss}$ is the steady state input parameter vector, the following relation holds true:

$$X^a_{ss} - X^P_{ss} = \Omega \delta U_{ss},$$

where $\Omega = ((I - A(I - GL))^{-1})B$ and where the superscript "−1" denotes matrix inverse, I is a $(j+i+2) \times (j+i+2)$ identity matrix, and L is a matrix $L = [0\ 0\ \ldots\ 0\ 1\ 0\ \ldots\ 0]$ with the "1" occurring in the j+1st entry.

If an input parameter is biased it can be further shown that a quantization of the input a parameter error may be determined as:

$$\delta u^e_r = (MAP_{ss} - MAP^P_{ss})\omega_{r,j+1},$$

where $\delta u^e_r$ is an estimate of the bias error in the r'th input (the r'th term of U(k), $u_r(k)$), $MAP_{ss}$ is the steady state value for MAP(k) at engine idle, $MAP^P_{ss}$ is the steady state value for $MAP^P(k)$ at engine idle, and $\omega_{r,j+1}$ is the term in the r'th row (the same row in U(k) as the biased input parameter) and the j+1st column of the matrix Ω.

Once $\delta u^e_r$ is determined, a corrected value for the biased input parameter equal to $(u_r(k) + \delta u^e_r)$ can be used in vector U(k) in place of $u_r(k)$ to calculate $X^P(k+1)$, offsetting the bias error of the input parameter $u_r(k)$.

Alternatively, an input parameter bias can be estimated using model estimation errors (errors in $X^e(k)$). It can be shown that, where $X^e_{ss}$ is the steady state model estimation vector, in a steady state condition:

$$X^a_{ss} - X^e_{ss} = (I - GL)\Omega \delta U_{ss}.$$

If $\omega'_{r,f}$ is the element of matrix $(I-GL)\Omega$ in the r'th row and the f'th column, then the quantization of the input parameter error may be determined as:

$$\delta u^e_r = (MAP_{ss} - MAP^e_{ss})/\omega'_{r,j+1}.$$

The input parameter may then be offset as explained above.

If the particular prediction-estimation system being used has consistently accurate input parameter measurements, then this invention can be used for estimating incorrectly specified prediction-estimation model constants in matrix C. It can be shown that:

$$X^a_{ss} - X^p_{ss} = \Omega^* \delta C,$$

where matrix $\Omega^* = ((I - A(I - GL))^{-1})$ and the superscript "$-1$" denotes matrix inverse. If it can be supposed that $h_1$ is the model constant most likely to be in error, then the error in $h_2$ is assumed to be zero and it can be further shown that:

$$\delta h^e_1 = (MAP_{ss} - MAP^p_{ss})/\Omega^*_{j+1,j+1},$$

where $\delta h^e_1$ represents an estimate of the error in the model constant, $h_1$, and $\Omega^*_{j+1,j+1}$ is the element of matrix $\Omega^*$ in the j+1st row and the j+1st column. After the model parameter error is determined, it may be offset by substituting into the matrix C the sum $(h_1 + \delta h^e_1)$ for $h_1$ when determining the model-based predictions.

If it can be supposed that $h_2$ is the model constant most likely to be in error, then the error in $h_1$ is assumed to be zero and it can be further shown that:

$$\delta h^e_2 = (MAP_{ss} - MAP^p_{ss})/\Omega^*_{j+i+2,j+1},$$

where $\delta h^e_2$ represents an estimate of the error in the model constant, $h_2$. After the model parameter error is determined, it may be offset by substituting into the matrix C the sum $(h_2 + \delta h^e_2)$ for $h_2$ when determining the model-based predictions.

Similarly, an error in a model parameter in the C matrix can be estimated using estimation errors It can be shown that:

$$X^a_{ss} - X^e_{ss} = (I - GL)\Omega^* \delta C.$$

and, where $h_1$ is the model constant most likely to be in error, it can be further shown that:

$$\delta h^e_1 = (MAP_{ss} - MAP^p_{ss})/\omega''_{j+1,j+1},$$

where $\omega''_{j+1,j+1}$ is the element of matrix $(I - GL)\Omega^*$ in the j+1st row and j+1st column. If $h_2$ is the model constant most likely to be in error, it can be shown that:

$$\delta h^e_2 = (MAP_{ss} - MAP^p_{ss})/\omega''_{j+i+2,j+1}.$$

Once determined, the model parameter error can be offset as described above.

Figure 3:
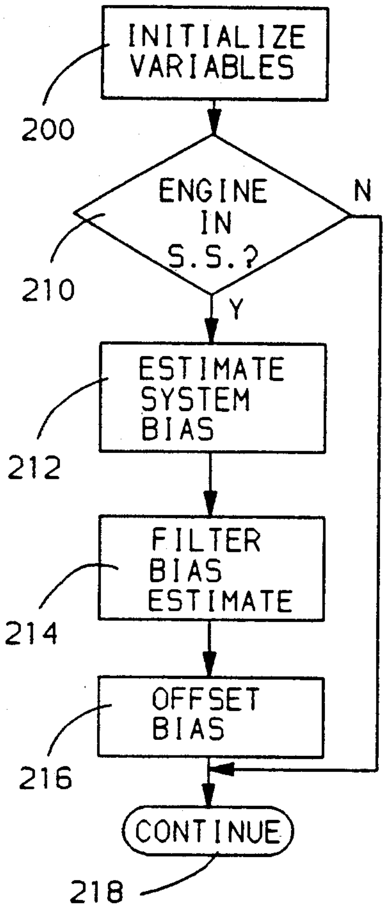
FIG. 3 is computer flow diagram for one implementation of this invention.

The computer flow diagram shown in FIG. 3 represents a straight forward computer implementation of this invention. The computer implementation would be executed by a microcomputer in the control unit 12 (FIG. 1) during the prediction-estimation of an engine parameter. Variables are initiated, block 200, during the microcomputer initialization routine, which may occur at engine startup.

The error estimation and correction routine, starting at block 210, preferably takes place between the model prediction and model estimation if the error estimate is based upon model prediction error. If, however, the error estimate is based upon model estimation error, the error estimation and correction routine preferably takes place between the model estimation and model prediction.

At block 210, the program determines if the engine is in a steady state. The engine may be said to be in a steady state if:

$$TPS(k) \simeq TPS(k-1) \simeq TPS(k-2) \simeq TPS(k-3),$$

$$RPM(k) \simeq RPM(k-1) \simeq RPM(k-2) \simeq RPM(k-3),$$

and $$MAP(k) \simeq MAP(k-1) \simeq MAP(k-2) \simeq MAP(k-3).$$

Any other suitable test for steady state may be alternatively employed. If the engine is not in a steady state, then the program leaves the error estimation and correction routine by jumping to block 218. If, however, the engine is in a steady state, the system bias is estimated at block 212 according to any of the methods of this invention described above.

At block 214, the bias estimate is heavily filtered to prevent the determinable parameter estimations from wildly fluctuating. At block 216, the system bias is offset with the filtered bias estimate and at block 218, the program continues with the prediction-estimation routine with the system bias offset, increasing the accuracy of the results.

Figure 4A:
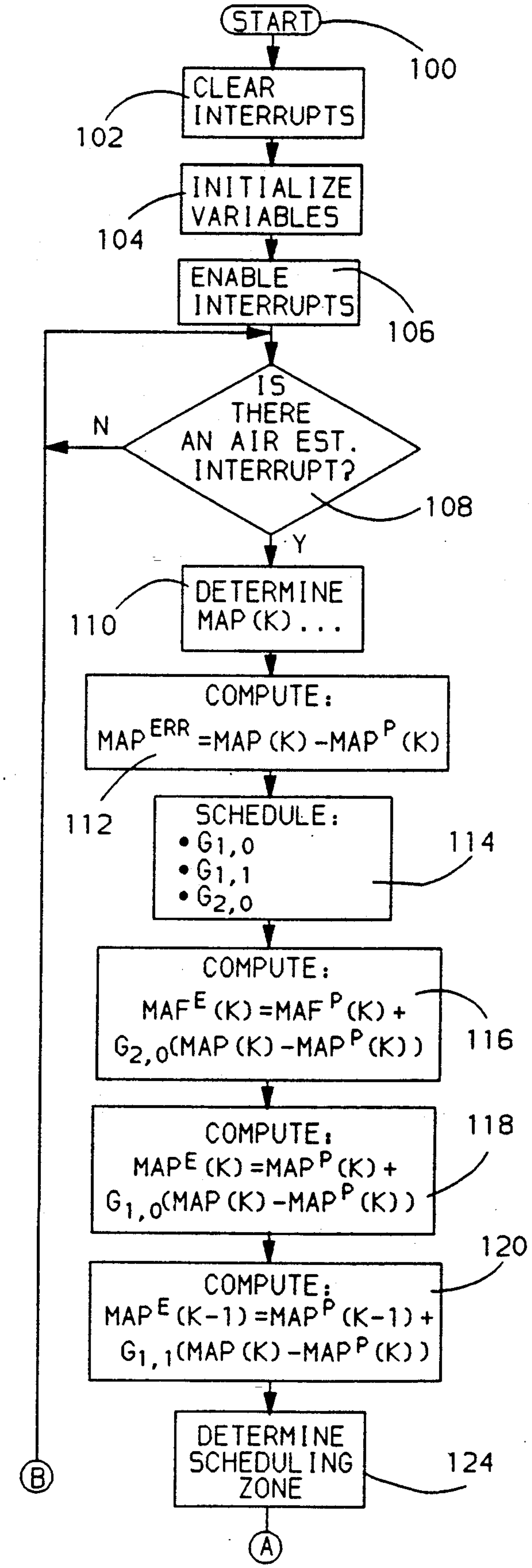
Figure 4B:
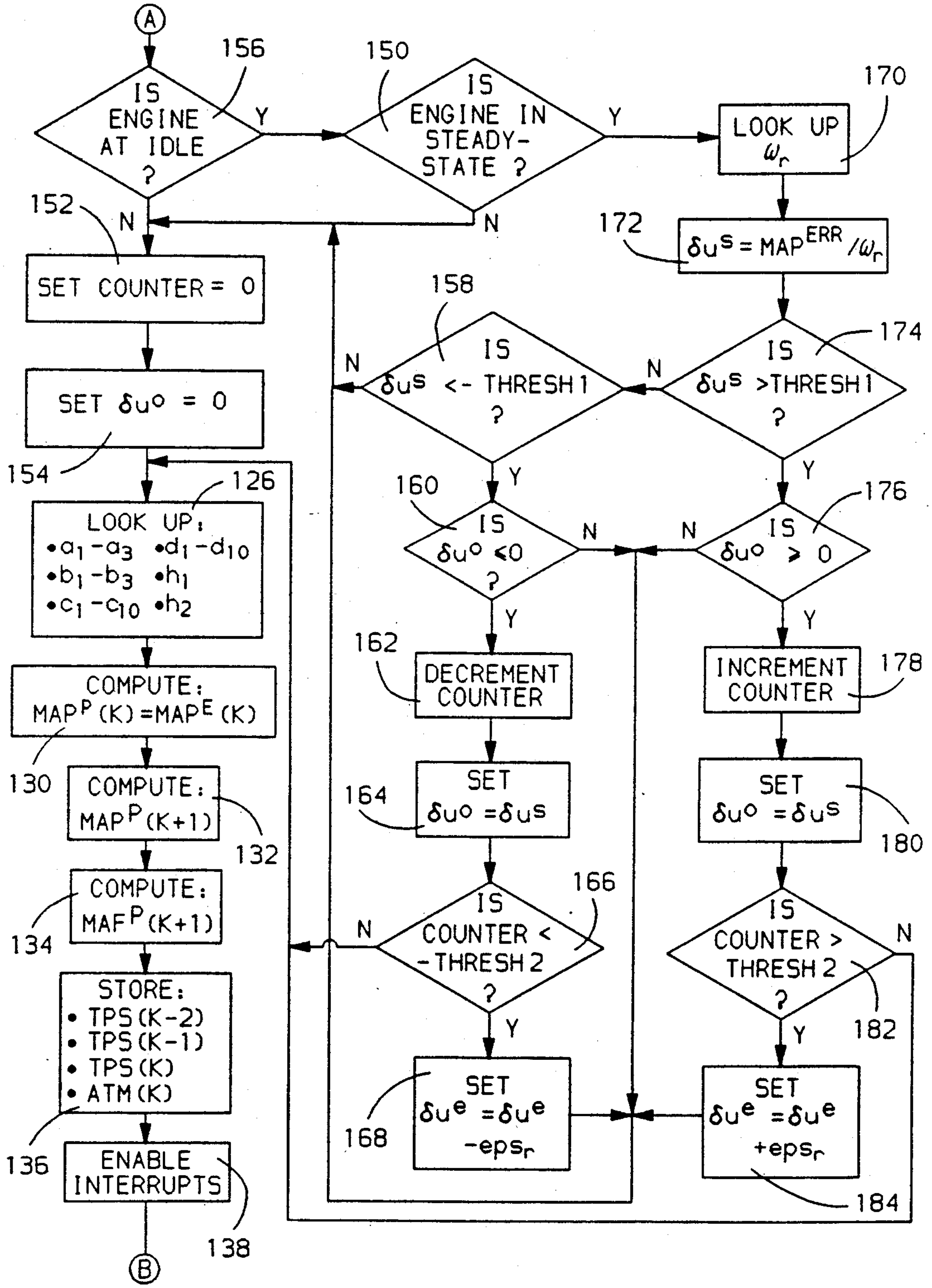

Referring now to FIGS. 4a and 4b, the preferred implementation of this invention with the software air meter takes into account atmospheric pressure and the IAC and EGR valves, sets: e=3, j=1, i=0, m=0, n=0, and 1=1 and assumes the majority of prediction and estimation error to be due to an error in IAC(k). The assumption that system error is primarily due to IAC valve bias is valid because IAC(k) is determined from the IAC valve command on line 16 (FIG. 1) and there is no position feedback of IAC(k). The other parameter measurements can all be safely assumed to have minimal error due to inherent system accuracies or positional feedback control.

Steps 100, 102, 104, and 106 startup the system and initialize the variables. At step 108, the system checks for an interrupt signal, which is produced by the engine controller whenever it requires a new mass airflow estimate. If there is an interrupt, the program proceeds into the prediction-estimation loop starting at box 110, where the engine parameter measurements MAP(k), RPM(k), TPS(k), IAC(k), EGR(k), T(k), and ATM(k) are determined. At step 112, the computer calculates a value for manifold pressure error, $MAP^{err}$, where $MAP^{err} = MAP(k) - MAP^p(k)$. At step 114 the estimator correction coefficients are scheduled and retrieved. The limit on the estimator correction coefficients scheduled at step 114 is that all the roots of a polynomial, f(z), described below, must be within the unit circle. The polynomial f(z) is the determinant of a matrix M, defined:

$$M = zI - A + GLA.$$

At steps 116, 118, and 120, $MAF^e(k)$, $MAP^e(k)$, and $MAP^e(k-1)$ are computed. The computer determines the model parameter schedule zone utilizing RPM(k) and MAP(k) at step 124.

Implementation of the method of estimation of bias errors of this invention starts with block 156 (FIG. 4b). In the implementation shown, the IAC valve bias error is corrected in small steps, $eps_r$. The decision to take the $eps_r$ step is based on the sign of the bias estimate, $\delta u^e$, the sign of the last bias estimate. $\delta u^o$, and the value of the counter that keeps track of the number of successive times the bias estimates of the same sign exceed a calibrated threshold. This method keeps the value of the sum $(IAC(k)+\delta u^e)$ from wildly varying with every iteration of the routine shown.

5 After the scheduling zone is determined at block 124, block 156 tests to see if the engine is at idle. The engine is at idle if the scheduling zone determined at block 124 is the scheduling zone corresponding to engine idle. If the engine is not at idle, the counter is set to zero at block 152, the last bias estimate, $\delta u^o$, is set to zero at block 154, and the computer continues with its routine at block 126 as described below.

If the engine is found to be at idle at block 156, then block 150 tests to see if the engine is in a steady state. The engine may be said to be in steady state if:

$$TPS(k) \approx TFS(k-1) \approx TPS(k-2) \approx TPS(k-3),$$

$$RPM(k) \approx RPM(k-1) \approx RPM(k-2) \approx RPM(k-3),$$

and $$MAP(k) \approx MAP(k-1) \approx MAP(k-2) \approx MAP(k-3).$$

Other steady state tests may be alternatively employed. If the engine is not in a steady state, then the program continues to block 152. If the engine is in a steady state, then the program moves to block 170 where a value for $\omega_r$ is determined from a lookup table in computer memory, $\omega_r$ representing the element in the j+1st row (here j+1=2) and the e+m+3rd column (here e+m+3=6) of matrix Ω described above, or more generally, $\omega_r$ is the same element in Ω corresponding to the IAC(k) MAP prediction model input coefficient in matrix B above.

A present IAC valve error estimate, $\delta u^s$, is determined at block 172 according to the equation: $\delta u^s=-MAP^{err}/\omega_r$. At block 174, the present error estimate is compared to a first threshold (e.g., one increment in IAC valve position command), if the present error estimate is greater than the first threshold then the the routine proceeds to block 176, otherwise to block 158. At block 176, the previous error estimate, $\delta u^o$, is compared to zero. If the previous error estimate is less than zero, then the computer jumps to block 152. If the previous error estimate is greater than or equal to zero, then the counter is incremented at block 178 and the present error estimate becomes the previous error estimate at block 180.

If the counter is not greater than the second threshold (e.g., 8) at block 182, then the computer jumps to block 126. If the counter is greater than the second threshold at block 182, then the IAC error correction value, $\delta u^e$, is updated at block 184 so that $\delta u^e=\delta u^e+eps_r$. The computer then moves to block 152.

If, at block 174, the present error estimate was not greater than the first threshold, then it is compared to a negative of the first threshold at block 158. If the present error estimate is not less than the negative of the first threshold at block 158, then the computer jumps to block 152. If the present error estimate is less than the negative of the first threshold at block 158, then the previous error estimate is compared to zero at block 160. If the previous error estimate is greater than zero at block 160, then the computer jumps to block 152. If the previous error estimate is not greater than zero at block 160, then the computer moves to block 162 where the counter is decremented and to block 164 where the present error estimate becomes the previous error estimate.

At block 166, the counter is compared to the negative of the second threshold. If the counter is not less than the negative of the second threshold at block 166, then the computer jumps to block 126. If the counter is less than the negative of the second threshold at block 166 then block 168 updates the IAC error correction value, $\delta u^e$, such that $\delta u^e=\delta u^e_{-eps_r}$ and the controller continues to block 152.

After block 154, the program continues to block 126 where the model parameters are looked up and to block 130 where $MAP^P(k)$ is computed such that $MAP^P(k)=MAP^e(k)$. At block 132, $MAP^P(k+1)$ is computed using a corrected value for IAC(k) with the bias error offset according to the method of this invention, such that:

$$MAP^P(k+1)=a_1MAP^e(k-1)+a_2MAP^e(k)+a_3MAF^e(k)+c_1TPS(k)+c_2TPS(k-1)+c_3TPS(k-2)+c_4TPS(k-3)+c_5RPM(k)+c_6(IAC(k)+\delta u_e)+c_7EGR(k)+c_8T(k)+c_9ATM(k)+c_{10}ATM(k-1)+h_1.$$

At step 134, $MAF^P(k+1)$ is computed, with the bias error offset, according to the equation:

$$MAF^P(k+1)=b_1MAP^e(k-1)+b_2MAP_e(k)+b_3MAF^e(k)+d_1TPS(k)+d_2TPS(k-1)+d_3TPS(k-2)+d_4TPS(k-3)+d_5RPM(k)+d_6(IAC(k)+\delta u_e)+d_7EGR(k)+d_8T(k)+d_9ATM(k)+d_{10}ATM(k-1)+h_2.$$

At step 136, the computer prepares for the next time event by storing TPS(k−2), TPS(k−1), TPS(k), and ATM(k). At step 138 the interrupts are enabled and the program loops back to step 108.

In the example described in FIGS. 4*a* and 4*b*, this invention is implemented with the software air meter of the above described related patent application to increase the accuracy of the estimated mass airflow into the engine by estimating and offsetting bias errors in the IAC valve position measurements. This invention is not limited to the above described examples nor to the estimation and correction of IAC valve position biases. For example, in many systems, the EGR valve does not have position feedback. It follows that EGR valve position is another parameter that is likely to have bias errors. If error in all the other input parameters can be minimized, then this invention can be implemented to estimate and correct bias errors in EGR valve position measurements.

This invention can also be implemented in systems where only one engine state is predicted, such as in the system described in copending U.S. patent application Ser. No. 653,922. In such implementations, the accuracy of the state prediction is increased.

The specific bias error which this invention may be implemented to estimate and correct depends upon the vehicle engine estimation-prediction system implemented. Implementations of this invention may vary as specific system requirements dictate. Various improvements and modifications to this invention as illustrated above may occur to those skilled in the art and fall within the scope of this invention as set forth below.

The embodiments of the invention in which an exclusive property or privilege is claimed are defined as follows:

1. In an engine control system in which the value of an unmeasured engine parameter is determined through measurement of the values of other parameters including a control parameter and the iterative prediction and estimation of the values of the control parameter and the unmeasured parameter based upon the other measured parameter values and a system model, the improvement comprising the steps of:

comparing the estimated value of the control parameter with the measured value of the control parameter during steady state operation to derive a quantitative indication of system bias; and employing the quantitative indication of system bias in the iterative prediction of the control parameter and the unmeasured parameter thereby improving the accuracy of the unmeasured parameter value estimation.

2. In an engine control system in which the value of an unmeasured engine parameter is determined through measurement of the values of other parameters including a control parameter and the iterative prediction and estimation of the values of the control parameter and the unmeasured parameter based upon the other measured parameter values and a system model, the improvement comprising the steps of:

comparing the predicted value of the control parameter with the measured value of the control parameter during steady state operation to derive a quantitative indication of system bias; and employing the quantitative indication of system bias in the iterative prediction of the control parameter and the unmeasured parameter thereby improving the accuracy of the unmeasured parameter value estimation.

3. In an engine control system in which future values of at least one engine state is predicted through iterative prediction and estimation responsive to measures of various engine parameters, including a measure of the one engine state, the improvement comprising the steps of:

comparing the predicted value of the one engine state with the measured value of the one engine state during steady state operation to derive a quantitative indication of system bias; and employing the quantitative indication of system bias in the iterative prediction of the one system state thereby improving the accuracy of the predicted future values of the one engine state.

4. A method for estimating and correcting bias errors in a vehicle system which implements iterative prediction and estimation to predict a measure of at least one vehicle engine parameter in response to a set of model parameters and various measured engine parameters, comprising the steps of:

determining a measure of error between the predicted and measured values of the one engine parameter while the vehicle is in a steady state condition;

estimating a system bias in response to the determined error; and offsetting the system bias in subsequent predictions, thereby reducing the error between the predicted and measured values of the one engine parameter.

5. A method for estimating and correcting bias errors in a vehicle system which implements iterative prediction and estimation to determine a measure of at least one determinable vehicle engine parameter and predicts at least one control parameter, which is also separately measured, in response to a set of model parameters and various measured engine parameters, comprising the steps of:

determining a measure of error between the predicted and measured values of the control parameter while the vehicle is in a steady state condition;

estimating a system bias in response to the determined error; and offsetting the system bias in subsequent predictions, thereby reducing the error between the predicted and measured values of the control parameter and increasing the accuracy of the estimations of the determinable vehicle parameter.

6. The method of claim 5 wherein the system bias is substantially due to an error in one model parameter.

7. The method of claim 5 also comprising the step of filtering the estimated system bias before the bias is offset.

8. The method of claim 5 wherein the system bias is substantially due to an error in measurement of one of the various measured engine parameters.

9. The method of claim 8 wherein the determinable engine parameter is mass airflow into the engine and the control parameter is engine intake manifold pressure.

10. The method of claim 9 wherein the various measured engine parameters include IAC valve position and the system bias is substantially due to an error in measurement of the IAC valve position.

11. The method of claim 8 additionally comprising the step of first determining if the engine is at idle and continuing through the estimating and correcting method only if the engine is at idle.

12. The method of claim 11 additionally comprising, after the step of determining if the engine is at idle, the step of:

determining a division factor, $\omega_r$, corresponding to the model parameters at engine idle; and after the step of determining control parameter error, the steps of:

determining a preliminary estimated system bias as: (control parameter error)/$\omega_r$;

comparing the preliminary estimated system bias to a first threshold, and continuing if the preliminary estimated system bias has a magnitude greater than the first threshold;

determining if both the preliminary estimated system bias and a previous estimated system bias are positive;

determining if both the preliminary estimated system bias and the previous estimated system bias are negative;

incrementing a counter if both the preliminary system bias and the previous estimated system bias are positive; and decrementing the counter if both the preliminary estimated system bias and the previous estimated system bias are negative, wherein the step of estimating system bias includes: (1) comparing the counter to a second threshold, (2) incrementing the system bias by a predetermined step if the counter is greater than the second threshold, and (3) decrementing the system bias by the predetermined step if the counter is less than a negative of the second threshold.

13. The method of claim 12 wherein the determinable engine parameter is mass airflow into the engine and the control parameter is engine intake manifold pressure.

14. The method of claim 13 wherein the various measured engine parameters include IAC valve position and the system bias is substantially due to an error in measurement of the IAC valve position.

15. A method for estimating and correcting bias errors in a vehicle system which implements iterative prediction and estimation to determine a measure of at least one determinable vehicle engine parameter and estimates at least one control parameter, which is also separately measured, in response to a set of model parameters and various measured engine parameters, comprising the steps of:

determining a measure of error between the estimated and measured values of the control parameter while the vehicle is in a steady state condition;

estimating a system bias in response to the determined error; and offsetting the system bias in subsequent predictions, thereby reducing the error between the estimated and measured values of the control parameter and increasing the accuracy of the estimations of the determinable vehicle parameter.

16. The method of claim 15 wherein the system bias is substantially due to an error in one model parameter.

17. The method of claim 5 also comprising the step of filtering the estimated system bias before the bias is offset.

18. The method of claim 15 wherein the system bias is substantially due to an error in measurement of one of the various measured engine parameters.

19. The method of claim 18 wherein the determinable engine parameter is mass airflow into the engine and the control parameter is engine intake manifold pressure.

20. The method of claim 19 wherein the various measured engine parameters include IAC valve position and the system bias is substantially due to an error in measurement of the IAC valve position.

21. The method of claim 18 additionally comprising, after the step of determining if the engine at idle, the steps of:

determining a division factor, $\omega_r$, corresponding to the model parameters at engine idle; and after the step of determining control parameter error, the steps of:

determining a preliminary estimated system bias as: (control parameter error)/$\omega_r$;

comparing the preliminary estimated system bias to a first threshold, and continuing if the preliminary estimated system bias has a magnitude greater than the first threshold;

determining if both the preliminary estimated system bias and a previous estimated system bias are positive;

determining if both the preliminary estimated system bias and the previous estimated system bias are negative;

incrementing a counter if both the preliminary estimated system bias and the previous estimated system bias are positive; and decrementing the counter if both the preliminary estimated system bias and the previous estimated system bias are negative, wherein the step of estimating system bias includes: (1) comparing the counter to a second threshold, (2) incrementing the system bias by a predetermined step if the counter is greater than the second threshold, and (3) decrementing the system bias by the predetermined step if the counter is less than a negative of the second threshold.

22. The method of claim 18 additionally comprising the step of first determining if the engine is at idle and continuing through the estimating and correcting method only if the engine is at idle.

23. The method of claim 22 additionally comprising, after the step of determining if the engine is at idle, the step of:

determining a division factor, $\omega_r$, corresponding to the model parameters at engine idle; and after the step of determining control parameter error, the steps of:

determining a preliminary estimated system bias as: (control parameter error)/$\omega_r$;

comparing the preliminary estimated system bias to a first threshold, and continuing if the preliminary estimated system bias has a magnitude greater than the first threshold;

determining if both the preliminary estimated system bias and a previous estimated system bias are positive;

determining if both the preliminary estimated system bias and the previous estimated system bias are negative;

incrementing a counter if both the preliminary estimated system bias and the previous estimated system bias are positive; and decrementing the counter if both the preliminary estimated system bias and the previous estimated system bias are negative, wherein the step of estimating system bias includes: (1) comparing the counter to a second threshold, (2) incrementing the system bias by a predetermined step if the counter is greater than the second threshold, and (3) decrementing the system bias by the predetermined step if the counter is less than a negative of the second threshold.

24. The method of claim 23 wherein the determinable engine parameter is mass airflow into the engine and the control parameter is engine intake manifold pressure.

25. The method of claim 24 wherein the various measured engine parameters include IAC valve position and the system bias is substantially due to an error in measurement of the IAC valve position.

* * * * *